(No Model.)
C. HALSTEAD.
CULINARY VESSEL.
No. 307,192.  Patented Oct. 28, 1884.
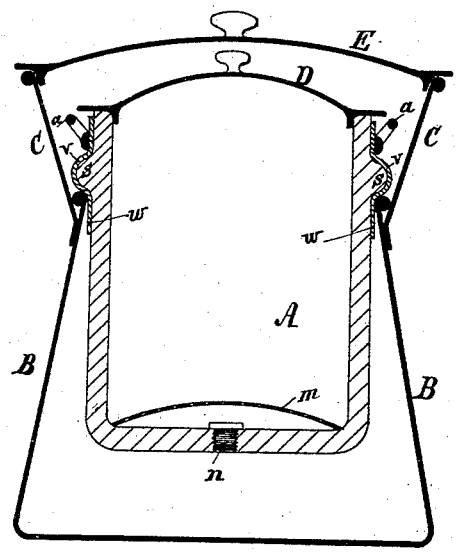
Witnesses
E. Lindgens
G. Sarniguet
Inventor.
Charles Halstead
per Henry E. Roeder
Attorney

UNITED STATES PATENT OFFICE.

CHARLES HALSTEAD, OF NEW YORK, N. Y.

CULINARY VESSEL.

SPECIFICATION forming part of Letters Patent No. 307,192, dated October 28, 1884.

Application filed February 26, 1884. (No model.)

*To all whom it may concern:*

Be it known that I, CHARLES HALSTEAD, a citizen of the United States, residing at New York, in the State of New York, have invented a new and useful Improvement in Culinary Vessels, of which the following is a specification.

The nature of my invention consists in the arrangement of one or more removable vessels in an outer vessel, and capable of being used for steaming or as a cooking-vessel; and, further, in the arrangement of the ledge and band on the inner vessel, through which the same is supported on the outer vessel.

The accompanying drawing represents a vertical section of the culinary vessels embodying my invention.

A is the inner vessel, made of earthenware or china, resting upon the top of an outer vessel, B, and capable of being easily removed. The outer vessel, B, is provided with an outward-flaring upper part or rim, C, extending above the top of the vessel A, and give the desired space for the supporting-ledge *s* and band *w* on the vessel A, as well as for the flange of the cover D, and for the hooks or handles *a a*, or suitable bail with which the vessel A is lifted. On the top of the rim C a suitable cover, E, is placed, to inclose the top of the vessel A. In the bottom of the vessel A an opening is made, closed by a removable plug, *n*. When the vessel A is used as a steamer, the plug *n* is removed and a concave perforated plate, *m*, is placed over the opening in the bottom, when the steam generated in the outer vessel, B, will enter through the opening at the bottom and be distributed into the interior, at the same time surrounding the exterior of the vessel A. By this construction large quantities of different kinds of food can be cooked at the same time by enlarging the outer vessel, B, to any desired size and shape, and provided with suitable openings or supports at the top to receive the inner vessel, A. Near the upper part of the vessel A a projection, *s*, of any desired shape, is made on the vessel A, around which a metallic band, *w*, is fitted, to protect the same from damage and hold the metallic band *w*, by which the vessel A is lifted, firmly in its place. The annular corrugation *v* of the band *w*, which surrounds the projection *s* of the vessel A, forms with it the necessary support to the vessel A upon the upper edge of the exterior vessel, B. The flaring top or rim C of the vessel B is formed or soldered steam-tight to the vessel B.

What I claim as my invention, and desire to secure by Letters Patent, is—

1. In combination, a china or earthenware vessel, A, the plug *n*, and perforated plate *m*, exterior supporting-vessel, B, having flaring rim C and cover E, as and for the purpose described.

2. In combination, a china or earthenware vessel, A, provided with a projection, *s*, near its upper end, the band *w*, having hooks or handles *a a*, and an annular corrugation, *v*, surrounding the projection *s*, and forming with it the flange for supporting the vessel A upon the top of the vessel B, provided with flaring rim C and cover E, substantially as described.

CHARLES HALSTEAD.

Witnesses:
HENRY E. ROEDER,
JACOB KOTLOWSKY.